United States Patent
Rodgers et al.

(10) Patent No.: US 10,569,959 B1
(45) Date of Patent: Feb. 25, 2020

(54) SENSOR ARRAY TO TRANSFER AN ITEM BASED ON ALIGNMENT

(71) Applicant: Amazon Technologies, Inc., Seattle, WA (US)

(72) Inventors: Tyler B. Rodgers, Puyallup, WA (US); Angel Luis Felix, Jr., Mesa, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/023,039

(22) Filed: Jun. 29, 2018

(51) Int. Cl.
*B65G 17/34* (2006.01)
*B65G 43/00* (2006.01)

(52) U.S. Cl.
CPC .......... *B65G 17/345* (2013.01); *B65G 43/00* (2013.01); *B65G 2207/18* (2013.01)

(58) Field of Classification Search
CPC .................................................. B65G 17/345
USPC ................................................. 198/370.06
See application file for complete search history.

(56) References Cited

U.S. PATENT DOCUMENTS

| | | | | |
|---|---|---|---|---|
| 3,747,781 A | * | 7/1973 | Daigle .................. | B65G 47/00 198/357 |
| 4,915,209 A | * | 4/1990 | Canziani ............... | B65G 43/08 198/357 |
| 6,129,199 A | * | 10/2000 | Gretener ............... | B65G 43/08 198/357 |
| 6,209,703 B1 | * | 4/2001 | Soldavini ............. | B65G 17/345 198/358 |
| 6,976,572 B2 | * | 12/2005 | Beck ..................... | B65G 43/08 198/358 |
| 9,227,228 B2 | * | 1/2016 | Kim ....................... | B07C 5/00 |
| 2002/0017537 A1 | * | 2/2002 | Barklin ................ | B65G 17/345 222/240 |

* cited by examiner

*Primary Examiner* — William R Harp
(74) *Attorney, Agent, or Firm* — Patterson + Sheridan, LLP

(57) ABSTRACT

Embodiments herein describe a control system that determines a location of an item on a first conveyor belt which affects the transfer of the item from the first conveyor belt onto a second conveyor belt. The control system includes a distance sensor which determines a location of the item on the first conveyor (or a location of the item on a queue belt that provides the item to the first conveyor). Using the distance sensor, the control system can identify the offset of the item relative to the center of the first conveyor belt. The control system can then control the time at which the item transfers from the first conveyor belt to the second conveyor belt by, for example, speeding up or slow down the first conveyor belt to compensate for the offset or adjusting an induct time.

15 Claims, 5 Drawing Sheets

SENSOR ARRAY TO TRANSFER AN ITEM BASED ON ALIGNMENT

BACKGROUND

The present invention relates to transferring an item between conveyors.

Many warehouses for shipping or storing items use conveyors to transport items to different locations in the warehouse for, e.g., sorting the items, storing the items, fulfilling customer orders, and the like. The warehouse may include locations where a first conveyor transfers items onto a second conveyor. For example, the first conveyor may terminate at a side of the second conveyor such that when items reach the end of the first conveyor they are pushed by the first conveyor (or some other actuator) onto the second conveyor. In some situations, the first conveyor transfers an item only at certain predefined locations on the second conveyor. As such, a controller can control the first and second conveyors so that the items are transferred from the first conveyor onto the predefined locations of the second conveyor.

DETAILED DESCRIPTION

Embodiments herein describe a control system that determines a location of an item along the width of a first conveyor belt which affects the transfer of the item from the first conveyor belt onto a second conveyor belt. In one embodiment, the second conveyor belt is a cross-belt (x-belt) sorter which includes a plurality of individually controlled x-belts. When transferring the item from the first conveyor onto the x-belt sorter, a control system attempts to move the package onto a selected one of the x-belts on the x-belt sorter. Put differently, the control system is configured to move the item onto a particular location (e.g., one of the x-belts) of the second conveyor belt.

In one embodiment, the control system includes a distance sensor which determines a location of the item along the width of the first conveyor (or a location of the item on a queue belt that provides the item to the first conveyor). Initially, the control system may assume that the item is located at the center of the first conveyor in the width direction; however, the distance of the item from the center of the first conveyor changes the location at which the item is transferred onto the second conveyor assuming a constant speed of both conveyors. Using the distance sensor, the control system can identify the offset of the item relative to the center of the first conveyor. The control system can then speed up or slow down the first conveyor to compensate for the offset. For example, the control system may set the speed of the first conveyor on the assumption the item is disposed on the center of the first conveyor. However, if the distance sensor identifies an offset, the control system can use the offset to vary the speed of the first conveyor to ensure the item ends up on the desired location of the second conveyor (e.g., a selected one of the x-belts).

In another embodiment, the distance measurement generated by the distance sensor is used to determine when to transfer the item onto the first conveyor using a queue belt. In this example, the first conveyor may operate at a constant speed. The distance sensor may be disposed on the queue belt to determine or predict where the item will be disposed when moved onto the first conveyor. Depending on the location of the item on the queue belt (and its corresponding location on the first conveyor), the control system can adjust the time at which the queue belt transfers the item onto the first conveyor. That is, when the item is offset from the center of the first conveyor, the control system transfers the item either earlier or later relative to the time the item would be transferred when located at a center of the queue belt. In this manner, the distance sensor can provide additional input which the control system can use to ensure the item is transferred onto a desired location of the second conveyor.

Figure 1:
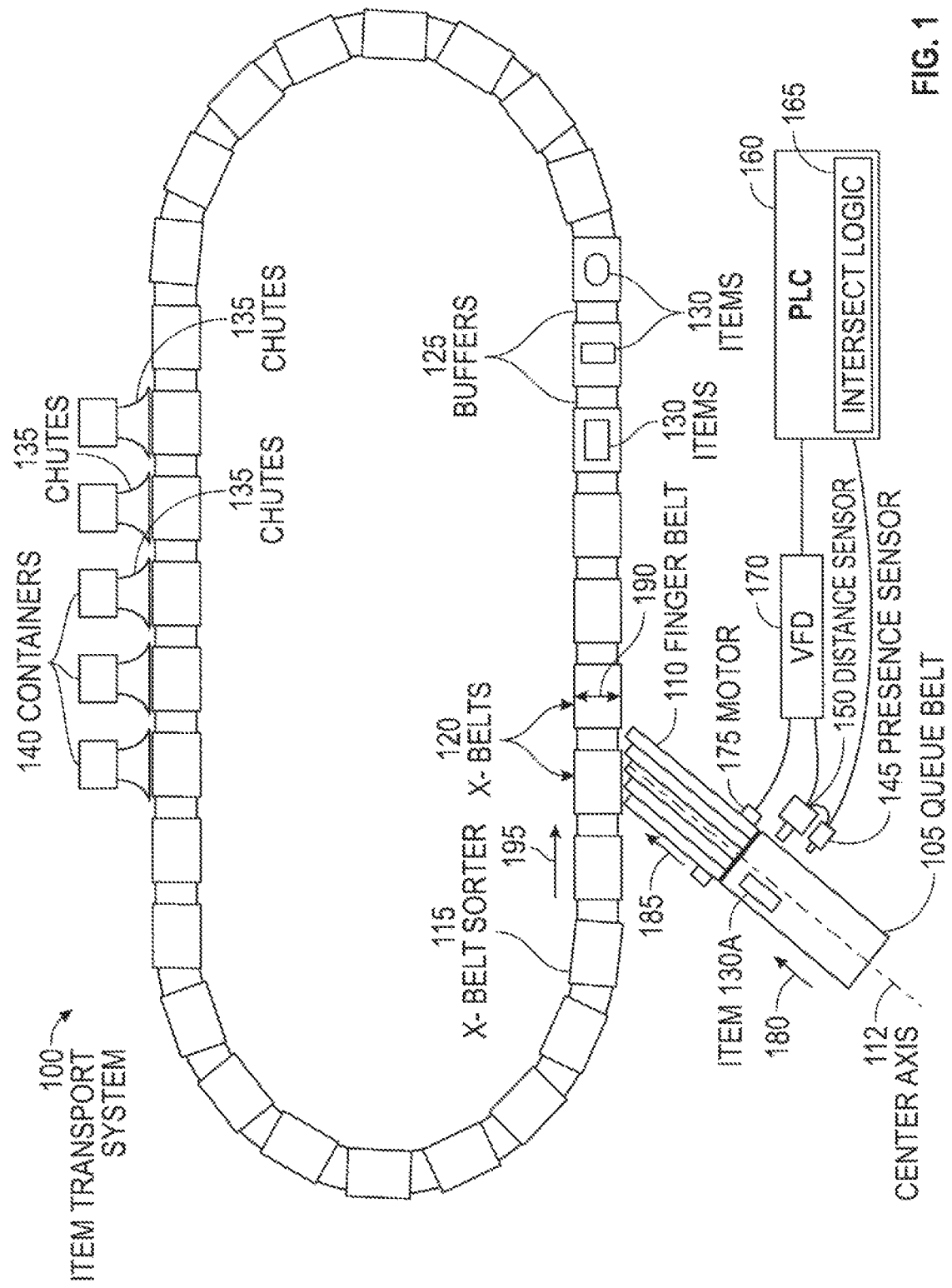
FIG. 1 illustrates an item transport system with intersecting conveyor belts, according to various embodiments.

FIG. 1 illustrates an item transport system 100 with intersecting conveyor belts, according to various embodiments. Specifically, the item transport system 100 includes a finger belt 110 (e.g., a feeder belt) which transfers packages onto a x-belt sorter 115. The x-belt sorter 115 includes individually controllable x-belts 120 which are separated from each other by respective buffers 125. In this example, the x-belt sorter 115 moves in the direction shown by the arrow 195 but the x-belts 120 move on an orthogonal axis as shown by arrow 190 when activated. Put differently, while the x-belt sorter 115 travels in a counter-clockwise direction as shown by the arrow 195, the x-belts 120 can be controlled to move along the axis shown by arrow 190 to either receive an item 130 (which is transferred from the finger belt 110) or eject an item 130.

As shown, the item transport system 100 includes a plurality of chutes 135 that abut the x-belt sorter 115. Each chute 135 corresponds to a container 140 (e.g., a box, tote, or Gaylord) for sorting the items 130 placed on the x-belts 120. Each container 140 may correspond to a particular shipping destination (e.g., zip code, state, third-party carrier, etc.) or store particular types of items 130. When a x-belt 120 reaches a chute 135 corresponding to a destination container 140 for the item 130 it is currently transporting, the x-belt 120 can activate to eject the item 130 into the chute 135 and the corresponding container 140. In this manner, items 130 received from the finger belt 110 can be loaded onto unoccupied x-belts 120 and then sorted into the containers 140.

For proper and predictable operation, it may be preferred that the items 130 are loaded onto the x-belts 120 without extending onto the buffers 125 or onto a neighboring x-belt 120. For example, if a portion of the item 130 is on the buffer 125, the x-belt 120 may have difficulty when attempting to eject the item 130 into one of the chutes 135. For example, the item 130 may become stuck on the buffer 125 and fail to eject off of the x-belt 120 or eject to the side and miss the chute 135. A similar problem may occur if the item 130 is disposed on two neighboring x-belts 120. As such, ensuring the finger belt 110 loads the items 130 onto only one of the x-belts 120 can improve the operation and reliability of the system 100.

The finger belt 110 includes a plurality of individual parallel belts which align the finger belt 110 to a side of the x-belt sorter 115. Segmenting the finger belt 110 to include multiple smaller belts (which can have different lengths) helps to reduce the gap between the finger belt 110 and the x-belt sorter 115. Nonetheless, the different belts of the finger belt 110 may be driven using the same motor 175 and thus, rotate at the same speed. However, the finger belt 110 is just one example of a feeder belt that can be used to transfer items onto the x-belt sorter 115. Further, in other embodiments, the finger belt 110 and the x-belt sorter 115 can be replaced by conveyors that use other means to move the items 130 besides belts, such as powered rollers or ball bearings.

Moreover, FIG. 1 illustrates arranging the finger belt 110 relative to the x-belt sorter 115 to form an acute angle relative to the direction the sorter 115 travels (shown by arrow 195) and the direction the finger belt 110 travels (shown by arrow 185). However, in other embodiments, the finger belt 110 may be disposed orthogonal to the x-belt sorter 115 or at an angle that is greater than ninety degrees. However, it may be preferred to dispose the x-belt sorter 115 and the finger belt 110 at an acute angle as shown so that the change in direction of the items 130 when transferring from the finger belt 110 to the x-belt sorter 115 is less drastic since both conveyor belts may be moving at the same time and have a speed component at least partially in the same direction. Put differently, the finger belt 110 can transfer the items 130 onto the x-belt sorter 115 without the sorter 115 stopping or pausing.

The item transport system 100 also includes a queue belt 105 which transfers packages onto the finger belt 110. For example, while the x-belt sorter 115 and the finger belt 110 may move constantly (e.g., without stopping), the queue belt 105 does start and stop in order to intelligently move an item 130 onto the finger belt 110. Although one queue belt 105 is shown, the system 100 may include multiple queue belts 105 that form a sequence of stages. For example, the system 100 may include three queue belts 105 which form three queue stages upstream from the finger belt 110. In one embodiment, an associate may retrieve and place a single item onto the queue belt 105 that is furthest from the finger belt 110 (e.g., the first stage). Based on instructions from a programmable logic controller (PLC) 160, the queue belt 105 closest to the finger belt 110 (e.g., the third stage) transfers its item onto the finger belt 110 which in turn transfers the item 130 onto the x-belt sorter 115. In response, the PLC 160 instructs the queue belt 105 forming the second stage to transfer its item 130 to the third stage and then instructs the queue belt 105 in the first stage to transfer its item 130 to the queue belt 105 of the second stage. Doing so frees up the queue belt 105 of the first stage so that the associate can place another item 130 on the belt 105. In one embodiment, only one item 130 is permitted on each queue belt 105 so that the finger belt 110 loads only one item 130 at a time onto the x-belt sorter 115 (but the finger belt 110 could have multiple items 130 disposed on it at the same time).

The PLC 160 includes intersect logic 165 which determines when the queue belt 105 should transfer the item 130A onto the finger belt 110 so that the finger belt 110 deposits the item 130A onto one of the x-belts 120 in the sorter 115, and not on the buffers 125 (or across two neighboring x-belts 120). For example, the intersect logic 165 may monitor a fixed location on the x-belt sorter 115 and its relative position to the finger belt 110. Because the speeds at which the x-belt sorter 115 and finger belt 110 are moving is known, as well as the locations of the x-belts 120 on the sorter, using this information, the intersect logic 165 can determine when to instruct the queue belt 105 to transfer the item 130A onto the finger belt 110 (which is already moving) such that the item 130A travels along the belt 110 and onto one of the x-belts 120. However, this calculation may assume that the item 130A is disposed at or near a center axis 112 of the queue belt 105 and the finger belt 110.

When placing the item 130A on the queue belt 105, the associate may place the item 130 to the left or right of the center axis 112. If the item 130A is sufficiently offset from the center axis 112, this offset introduces errors into the calculation performed by the intersect logic 165. In FIG. 1, the item 130A is disposed to the left of the center axis 112. Thus, when transferred onto the finger belt 110, the item 130A has less distance to travel before reaching the x-belt sorter 115 than if the item 130A was disposed at the center axis 112. As a result, the item 130A reaches the x-belt sorter 115 sooner than it would if disposed on the center axis 112, and a portion may end up disposed on the buffer 125 which precedes the selected x-belt 120. Conversely, if the item 130A was disposed to the right of the center axis 112, the item 130A has a greater distance to travel on the finger belt 110 before reaching the x-belt sorter 115 than if the item 130A was disposed at the center axis 112. As a result, the item 130A reaches the x-belt sorter 115 later and a portion may end up disposed on the buffer 125 that follows the selected x-belt 120.

Because it may be difficult to control where an associate or an automated system places the items 130 relative to the center axis 112, the embodiments herein include a sensor system for compensating for an offset from the center axis 112 when transferring items 130 onto the x-belt sorter 115. As shown, the item transport system 100 includes a presence sensor 145 and a distance sensor 150. The presence sensor 145 can be a laser or any other sensor which can detect the presence of the item 130A at the end of the queue belt 105. In one embodiment, the presence sensor 145 is disposed near a transfer region between the queue belt 105 and the finger belt 110. In one embodiment, the presence sensor 145 controls the operation of the queue belt 105 in that the belt 105 continues to move the item 130A towards the finger belt 110 as shown by the arrow 180 until the item 130A, for example, breaks a beam emitted by the presence sensor 145. In response to the item 130A reaching the end of the queue belt 105, the signal outputted by the presence sensor 145 (either to the PLC 160 or directly to a motor driving the queue belt 105) stops the queue belt 105. In this manner, the presence sensor 145 can inform the PLC 160 that there is an item 130A ready to be inducted onto the finger belt 110.

In addition to stopping the queue belt 105, the output of the presence sensor 145 is also provided to the distance sensor 150 which identifies the location of the item 130A along a direction perpendicular to the center axis 112 (e.g., along the width direction of the queue belt 105). Put differently, the distance sensor 150 identifies an offset of the item 130A relative to the center axis 112. As such, the distance sensor 150 may be arranged perpendicular to the arrow 180 and the center axis 112.

The distance sensor 150 can be any device that can measure a relative distance of items 130 traveling on the queue belt 105. For example, the sensor 150 can be a depth sensor, laser range finder, or other time of flight (TOF) device. In one embodiment, the distance sensor 150 emits a radio frequency (RF) signal that propagates perpendicular to the arrow 180 in order to determine where along the width of the queue belt 105 the item 130A is located. The distance sensor 150 may output an absolute measurement for the location of the item 130A (e.g., the item 130A is 30 cm from the distance sensor 150) or a relative measurement (e.g., the item 130A is offset to the left of the center axis 112).

The output of the distance sensor 150 is transmitted to a variable frequency drive (VFD) 170 which controls the motor 175. By directly connecting the distance sensor 150 to the VFD 170, the distance sensor 150 can be added to an existing system without having to update the software or firmware in the PLC 160. That is, the distance sensor 150 can be added without affecting (or needing to upgrade) the functions performed by the intersect logic 165. In one embodiment, the distance sensor 150 transmits an analog or digital signal to the VFD 170 which adjusts the speed of the motor 175. In one embodiment, the distance sensor 150 outputs an analog voltage that adjusts the motor control signal outputted by the VFD 170. For example, the distance sensor 150 may output a positive analog voltage to indicate the item 130A is to the left of the center axis 112 and a negative analog voltage to indicate the item 130A is to the right of the center axis 112. As the offset increases, e.g., the item 130 is further away from the center axis 112, the absolute value of the voltage outputted by the distance sensor 150 may also increase. If the item 130A is at the center axis 112, the distance sensor 150 may output a zero voltage or null signal indicating the VFD 170 should not change the default speed of the motor 175.

Using the absolute value and polarity of the voltage (e.g., whether the voltage is negative or positive), the VFD 170 can adjust the speed of the motor 175 accordingly. Using the example shown in FIG. 1, because the item 130A is to the left of the center axis 112, the distance sensor 150 outputs a signal to the VFD 170 which slows down the finger belt 110 so that the item 130A does not arrive too early when transferring from the finger belt 110 to the x-belt sorter 115. Thus, in response to the presence sensor 145 detecting the item 130A, the distance sensor 150 identifies the location of the item 130A on the queue belt 105 and generates a control signal for the VFD 170. Because many VFDs 170 have ports for receiving an analog or digital signal for adjusting the speed of the motor 175, the distance sensor 150 can be added as a plug-and-play upgrade to account for the location of the items 130 on the queue and finger belts 105 and 110 when attempting to transfer the items 130 to the x-belts 120. Put differently, adding the distance sensor 150 adds a sensor system for making fine tune adjusts to the control signals outputted by the intersect logic 165 without upgrading or changing the functions performed by the PLC 160. For example, the PLC 160 may instruct the VFD 170 to operate the finger belt 110 at a constant speed, but using the adjustment signal generated by the distance sensor 150, the VFD 170 can instead change the speed depending on the location of the item 130A relative to the center axis 112. However, the embodiments herein are not limited to a VFD 170 and can be applied to any type of motor controller. For example, an electronic speed controller (ESC) is another type of motor controller which can change the speed of a conveyor in response to a distance measurement.

Although FIG. 1 illustrates using the distance sensor 150 for transferring packages onto a x-belt sorter 115, the embodiments are not limited to such. In another example, instead of transferring the items 130 onto a x-belt sorter, the finger belt 110 may transfer items onto a normal conveyor belt or belts which do not have the x-belts 120. However, this belt may already have some items loaded onto it. If the finger belt 110 moved the item 130A onto a space on the conveyor belt that already has an item, one or both of the items may fall off of the conveyor belt. As such, the intersect logic 165 may instruct the queue belt 105 to transfer the item 130A such that the finger belt 110 moves the item 130A unto an unoccupied region of the conveyor belt. However, as discussed above, that synchronization can vary depending on the location of the item 130A relative to the center axis 112. Thus, the distance sensor 150 can be added to make fine tune adjustments to the speed of the motor 175 using the VFD 170.

Moreover, although the distance sensor 150 is positioned at the queue belt 105 in FIG. 1, in another embodiment, the distance sensor 150 may be positioned at the finger belt 110 and activated when the PLC 160 instructs the queue belt 105 to transfer the item 130A onto the finger belt 110.

Figure 2A:
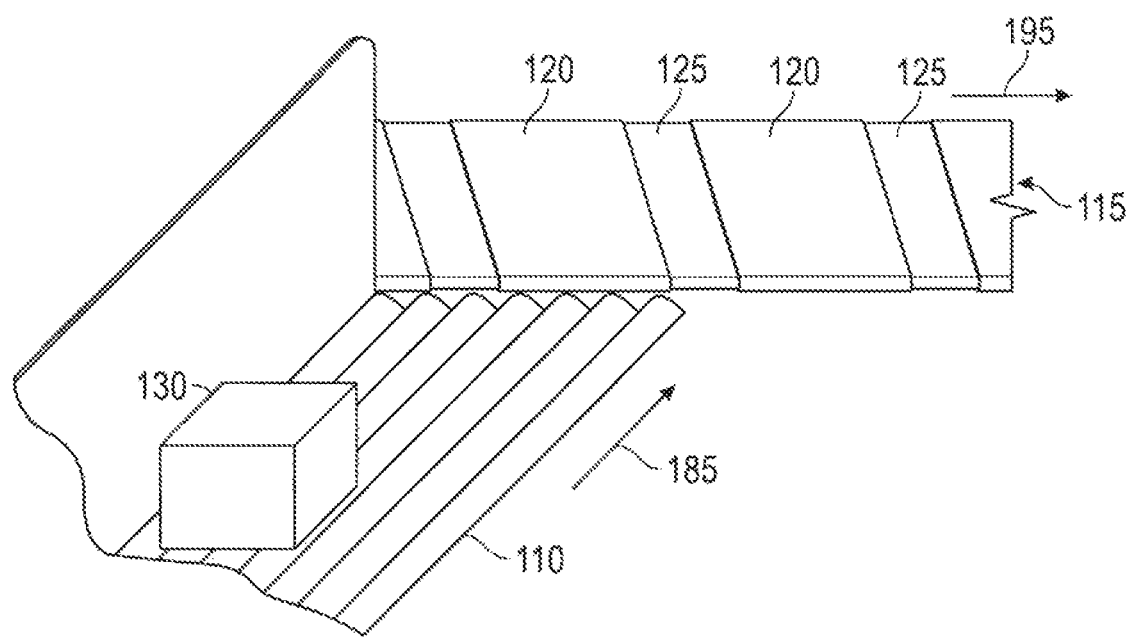
FIGS. 2A and 2B illustrate transferring an item between two conveyor belts, according to various embodiments.
Figure 2B:
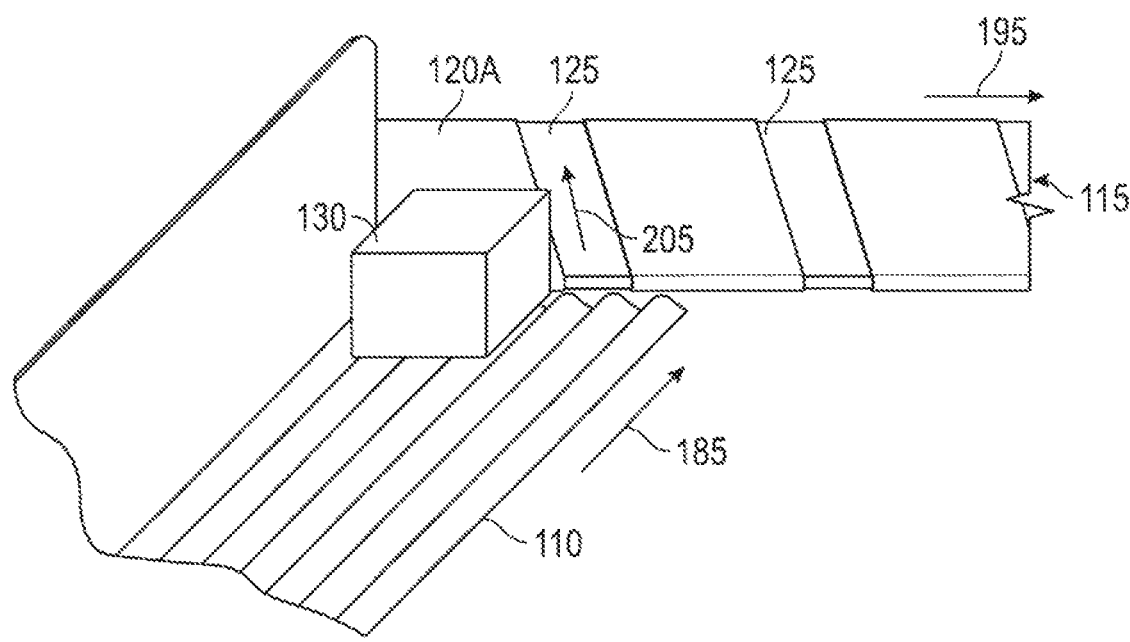

FIGS. 2A and 2B illustrate transferring an item between two conveyor belts, according to various embodiments. In this example, the finger belt 110 transfers the item 130 onto one of the x-belts 120 in the x-belt sorter 115 while the x-belt sorter 115 moves along the direction illustrated by the arrow 195. As above, each of the x-belts 120 in the sorter 115 are separated by buffers 125. The movement of the item 130 on the finger belt 110 and the locations of the x-belts 120 are preferably synchronized so that the item 130 is transferred onto a selected one of the x-belts 120 without overlapping the buffer 125 or another neighboring x-belt 120.

FIG. 2A illustrates that the item 130 was loaded onto the left side of the finger belt 110. As such, when moving in the direction illustrated by the arrow 185, the item 130 traverses a shorter distance than when disposed at the center of the belt 110 or on the right side of the belt 110 due to the acute angle between the x-belt sorter 115 and the finger belt 110. FIG. 2B illustrates performing a remedial action to compensate for the offset of the item 130 on the finger belt 110 such that the item is transferred onto the x-belt 120A without overlapping a buffer 125 or a neighboring x-belt 120. In one embodiment, the remedial action includes adjusting the speed the finger belt travels in the direction illustrated by the arrow 185 based on the location of the item 130. In another embodiment, the remedial action includes varying the time at which the item 130 is placed on the finger belt 110 (e.g., inducting the item 130 earlier or later than the default induct time). In either case, the finger belt 110 and the x-belt sorter 115 can be synchronized such that the item 130 is successfully transferred onto a selected one of the x-belts (e.g., x-belt 120A).

Further, the x-belt 120A may activate in order to aid the transfer of the item 130. As shown by the arrow 205, the x-belt 120A may move to pull the item 130 onto the x-belt sorter 115 at the same time the finger belt 110 moves in the direction of arrow 185 to push the item 130 onto the sorter 115. The PLC may deactivate the x-belt 120A using a timer or when a presence sensor determines the item 130 is fully on the x-belt 120A.

Figure 3:
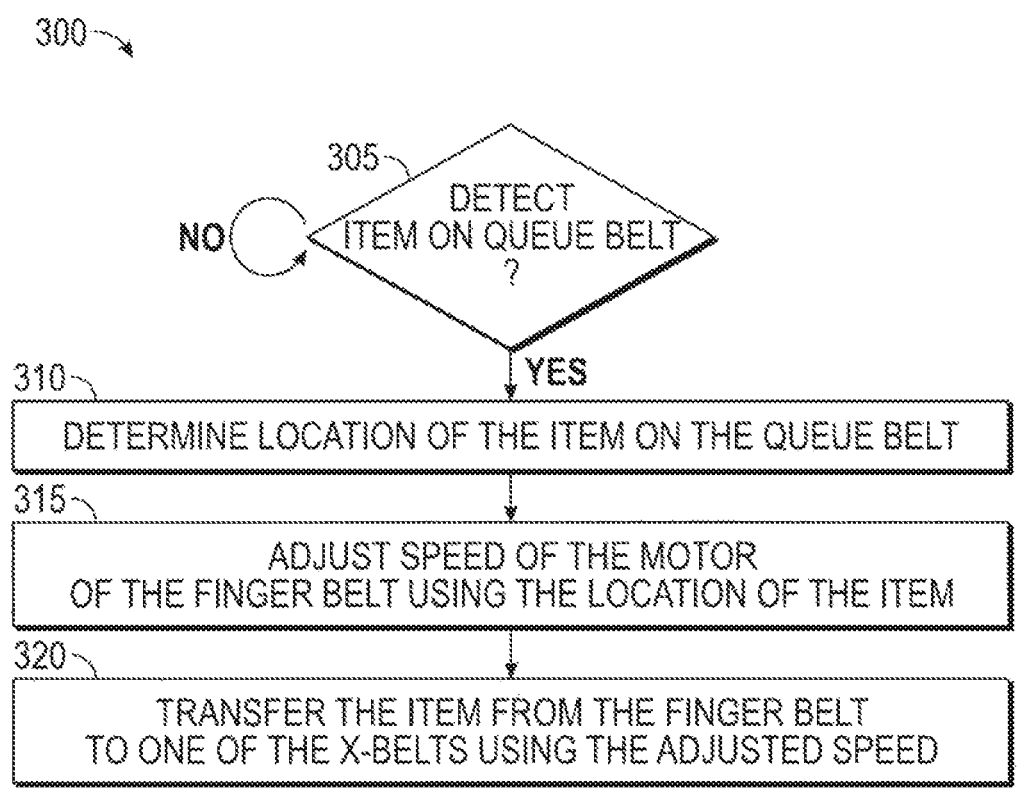
FIG. 3 is a flowchart for adjusting the speed of a conveyor belt when transferring an item, according to various embodiments.

FIG. 3 is a flowchart of a method 300 for adjusting the speed of a conveyor belt when transferring an item, according to various embodiments. At block 305, a presence sensor determines whether an item is on a queue belt. In FIG. 1, the presence sensor is disposed at an end of the queue belt 105 for determining when the item 130A is ready to be loaded onto the finger belt 110. This information can be provided to the PLC 160.

The intersect logic in the PLC determines when the item should be transferred from the queue belt onto the finger belt (e.g., a first conveyor). As mentioned above, the intersect logic may select a time to transfer the item from the queue belt to the finger belt so that the item is ultimately loaded onto a desired location of the x-belt sorter (e.g., a second conveyor belt). The embodiments herein are not limited to any particular technique for determining how to make an initial determination or estimate for moving the item onto the finger belt so that the finger belt moves the item onto the second conveyor belt at the desired location. For example, the intersect logic may track a fixed reference point on the x-belt sorter which permits the logic to ascertain the locations of the x-belts. Using the known speeds of the x-belt sorter and the finger belt, the intersect logic can determine when inducting the item on the finger belt causes the item to intersect the x-belt sorter at one of the x-belts. However, as discussed above, the calculations performed by the intersect logic may assume the item is at or near the center axis of the finger belt which can lead to variance in the intersection between the finger belt and the x-belt sorter when the item is disposed at other locations.

At block 310, the distance sensor determines the location of the item on the queue belt. In one embodiment, the distance is measured in a direction perpendicular to the movement of the belt. However, the distance can be measured at a different angle and the converted to determine the location of the item along the width of the queue belt.

In one embodiment, the queue and finger belts are arranged such that the location of the item along the width of the queue belt will be the same as the location of the item along the width of the finger belt. As such, measuring the location of the item along the width of the queue belt corresponds to the same width location on the finger belt. However, in other embodiments the queue belt and the finger belt may not have this relationship in which case the distance sensor may be mounted on the finger belt to directly measure the location of the item along its width.

At block 315, a VFD adjusts the speed of the motor of the finger belt using the location of the item along the width of the finger belt. That is, the VFD can adjust or control a time at which a feeder belt (e.g., the finger belt) transfers an item onto another conveyor belt (e.g., the x-belt sorter) by adjusting the speed of the feeder belt. In one embodiment, the VFD directly receives an adjustment signal from the distance sensor which indicates the offset of the item relative to a center axis of the queue or finger belts. The adjustment signal may include an analog or digital signal which correlates to a speed adjustment away from the default speed of the motor operating the finger belt. In one embodiment, the default speed is set by the PLC which the VFD then adjusts, or tunes, to compensate for the location of the item along the width of the finger belt.

At block 320, the finger belt transfers the item to one of the x-belts using the adjusted speed. Although the method 300 describes using a finger belt to transfer a package to a x-belt sorter with multiple x-belts, the method 300 can be used to transfer items between any two conveyors where a first conveyor terminates at a side of a second conveyor. For example, instead of placing the items on individual x-belts, the method 300 can be used to place the items on portions of the second conveyor belt that do not already have items on them.

Figure 4:
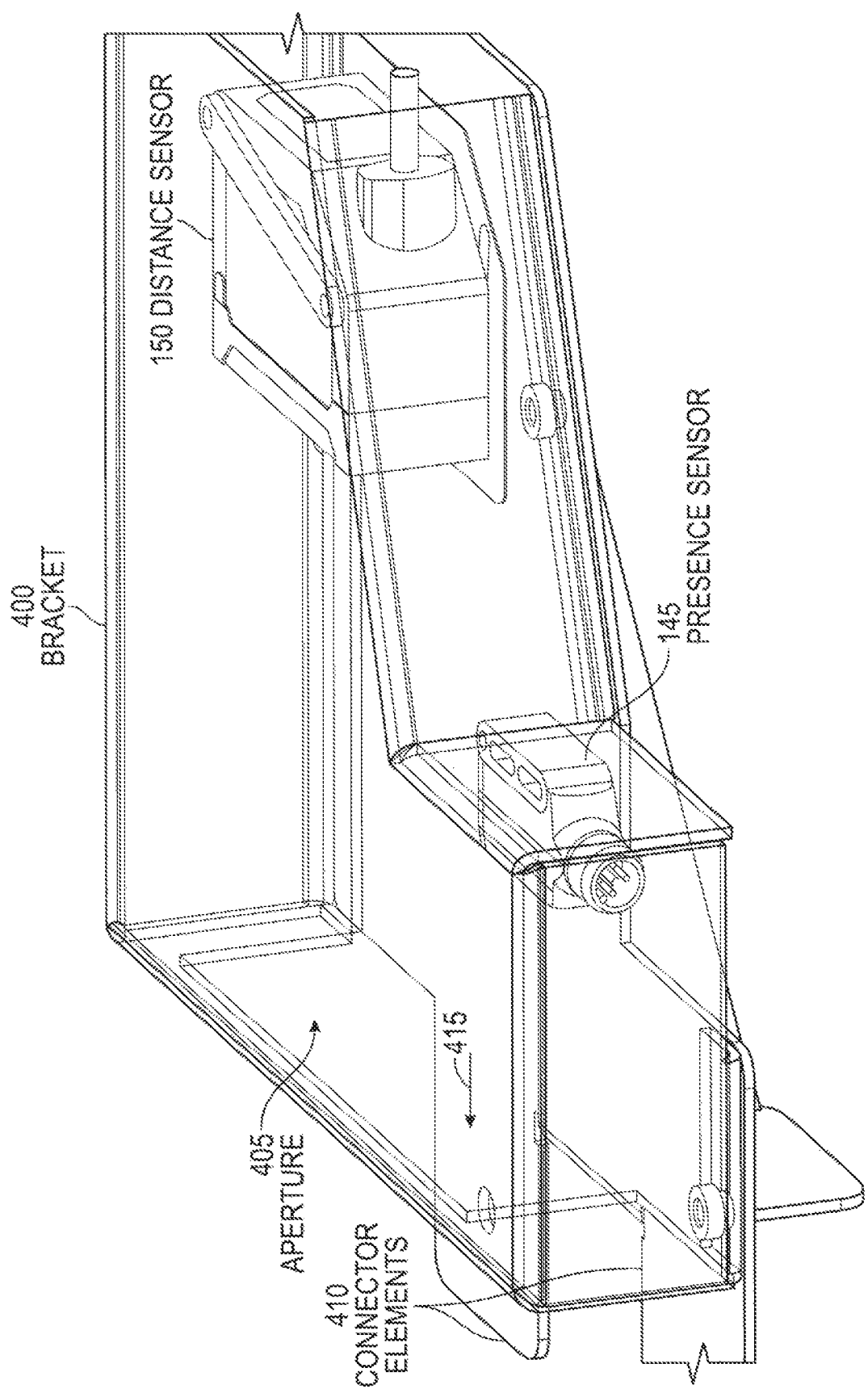
FIG. 4 is a bracket containing a distance sensor and presence sensor, according to various embodiments.

FIG. 4 is a bracket 400 containing a distance sensor 150 and presence sensor 145, according to various embodiments. For clarity, the outer surface of the bracket 400 is illustrated as being transparent so that the arrangement of the distance sensor 150 and the presence sensor 145 in the bracket 400 can be seen.

In one embodiment, the bracket 400 is mounted on the side of a conveyor belt (e.g., the queue belt 105 or the finger belt 110 illustrated in FIG. 1) using connector elements 410. The connector elements 410 may fix the bracket 400 to the conveyor belt such that an aperture 405 is parallel to the direction that items travel on the conveyor belt. Screws or bolts can extend through the connector elements 410 to rigidly attach the bracket 400 the conveyor belts so that unintentional bumps to the bracket 400 do not knock the bracket 400 out of alignment.

The distance sensor 150 and the presence sensor 145 in the bracket emit electromagnetic signals (e.g., radio frequency or optical signals) along the direction of the arrow 415 and pass through the aperture 405. In other words, the aperture 405 provides a window that permits the signals emitted by the distance sensor 150 and the presence sensor 145 to reach the conveyor belt while the outer surface of the bracket 400 protects the sensors from being knocked out of alignment or damaged.

The bracket 400 is just one example of a suitable structure for mounting the sensors to a conveyor belt to detect the presence and location of an item. For example, the bracket 400 may not encapsulate the sensors as shown. Further, in some examples, rather than placing the sensors in the same bracket 400, the distance sensor 150 and the presence sensor 145 may be individually mounted to the conveyor belt.

Figure 5:
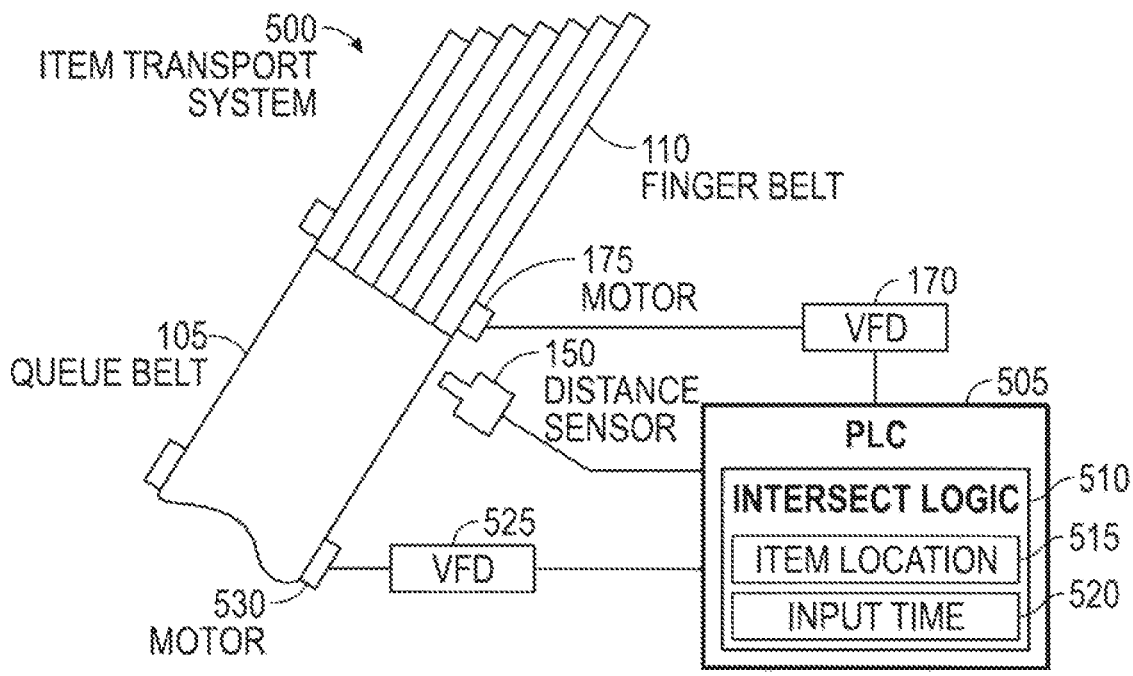
FIG. 5 illustrates an item transport system for transferring an item onto multiple conveyor belts, according to various embodiments.

FIG. 5 illustrates an item transport system 500 for transferring an item onto multiple conveyor belts, according to various embodiments. The item transport system 500 includes the queue belt 105 and the finger belt 110 which were described above. Further, the system 500 includes the distance sensor 150, but in contrast to FIG. 1, here the distance sensor 150 is connected to a PLC 505 rather than to the VFD 170 which controls the motor 175 of the finger belt 110. That is, rather than the distance sensor 150 having a direct connection the VFD 170 to control the speed of the motor 175, in FIG. 5 the distance measurement generated by the sensor 150 is transmitted to the PLC 505.

The PLC 505 includes intersect logic 510 that determines when to transfer the item from the queue belt 105 onto the finger belt 110 so that the item is transferred from the finger belt 110 onto a second conveyor belt (not shown in FIG. 5). The intersect logic 510 can use any of the techniques described above (or any other known technique) to determine a time when to induct the item onto finger belt 110 (which may be continuously moving) so that the item is disposed onto a desired location of the second conveyor belt. For example, the intersect logic 510 may use sensors that track the current locations of the x-belts on the second conveyor belt or a computer vision system to identify the occupied and unoccupied areas of the second conveyor belt. Using the speeds at which the finger belt 110 and the second conveyor belt are moving, the intersect logic 510 can determine when to move the item onto the finger belt 110. However, as mentioned above, the time at which the item should be moved onto the finger belt 110 can change depending on the location of the item on the queue belt 105 which affects the distance the item travels on the finger belt 110 before reaching the second conveyor belt.

To compensate for the location of the item along the width direction of the queue belt 105, the intersect logic 510 determines (or receives) an item location 515 which is based on the distance measurement generated by the distance sensor 150. That is, the item location 515 indicates where along the width of the queue belt 105 the item is currently located. In one embodiment, the item location 515 may be relative to a center axis of the queue belt 105 and the finger belt 110. In another embodiment, the item location 515 may be relative to a side of the queue belt 105 (e.g., the side of the belt 105 closest to the distance sensor 150).

Using the item location 515, the intersect logic 510 determines an induct time 520 for moving the item from the queue belt 105 onto the finger belt 110. If the item is already on the finger belt 110 (but the belt 110 is not moving), the induct time 520 can be the time at which the PLC activates the finger belt 110 to move the item onto the x-belt sorter. Regardless of the scenario, the induct time 520 can be determined by considering the location 515 of the item along the width direction of the queue belt 105 as well as the factors discussed above such as the location of the x-belts on the second conveyor belt, locations of unoccupied space on the second conveyor belt, the speeds of the second conveyor belt and the finger belt 110, and the like.

The PLC 505 is coupled to a VFD 525 which controls the motor 530 of the queue belt 105. At the set induct time 520, the PLC 505 instructs the VFD 525 to activate the motor 530 which moves the item from the queue belt 105 onto the finger belt 110. In one embodiment, the finger belt 110 is already moving. For example, the PLC 505 may instruct the VFD 170 to keep the finger belt 110 moving at a constant speed. However, the finger belt 110 could also be activated from a stationary state when, or immediately before, the queue belt 105 transfers the item.

In one embodiment, the distance sensor 150 also performs the function of the presence sensor illustrated in FIG. 1. That is, in addition to determining the location of the item in the width direction of the queue belt 105, the distance sensor 150 can inform the PLC 505 when an item reaches an end of the queue belt 105. In response, the PLC 505 can instruct the VFD 525 to stop the motor 530. The item may then wait on the queue belt 105 until the intersect logic 510 determines the induct time 520 has been reached and the queue belt 105 should transfer the item onto the finger belt 110.

Figure 6:
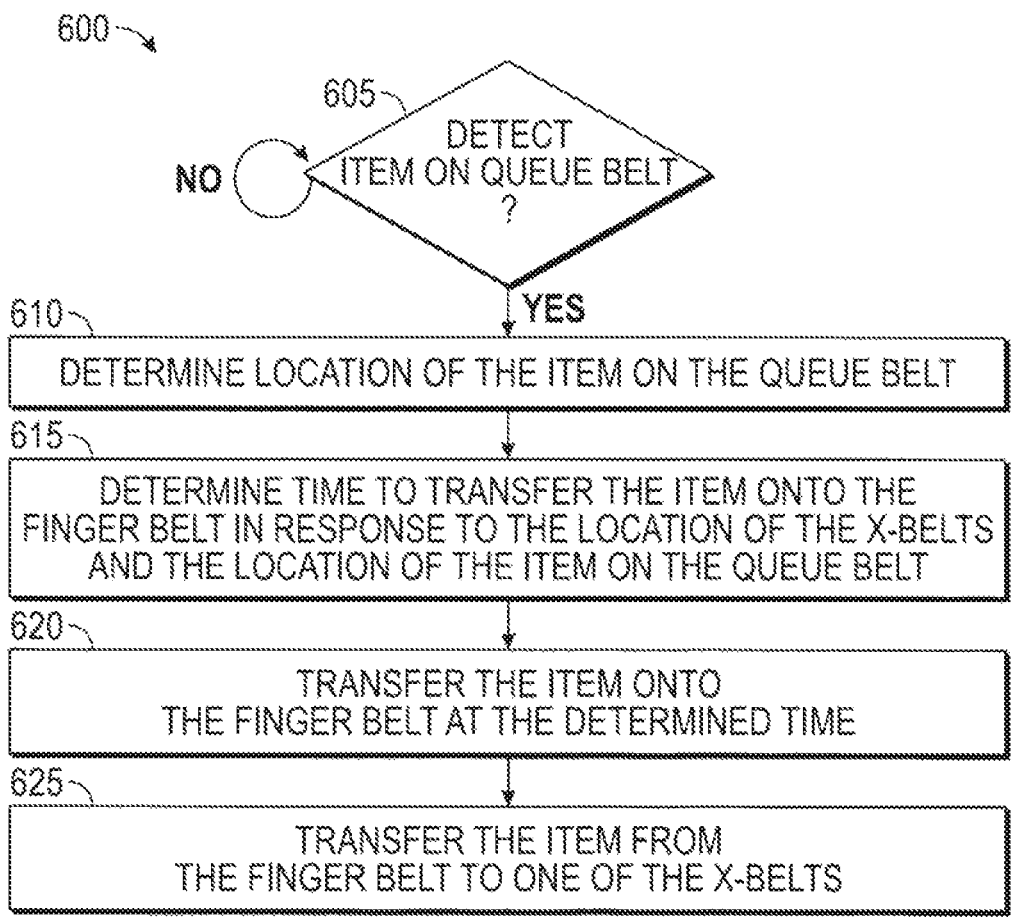
FIG. 6 is a flowchart for determining a time to transfer an item between conveyor belts, according to various embodiments.

FIG. 6 is a flowchart of a method 600 for determining an induct time to transfer an item between conveyor belts, according to various embodiments. At block 605, the distance sensor (or a separate presence sensor) detects an item on the queue belt. In one embodiment, the distance sensor determines when the item reaches an end of the queue belt closest to the finger belt. For example, in a system that includes multiple queue stages that each include a queue belt, when a queue belt receives a package from an upstream stage, the PLC instructs the queue belt to move the package until the package reaches an end of the queue belt interfacing with the next queue stage or the finger belt.

At block 610, the distance sensor determines a location of the item on the queue belt. In one embodiment, the location indicates the location of the item along the width direction of the queue belt which is perpendicular to the direction the item moves along the belt. As mentioned above, the location of the item may be relative to a center axis of the belt, a side of the belt, or the location of the distance sensor.

At block 615, the intersect logic in the PLC determines an induct time to transfer the time onto the finger belt in response to the location of the x-belts and the location of the item on the queue belt. Put differently, the intersect logic determines when the queue belt should transfer the item onto the finger belt so that the finger belt deposits the item onto a selected one of the x-belts. By adjusting the induct time in response to the location of the item on the queue belt, the intersect logic adjusts a time at which a feeder belt (e.g., the finger belt) transfers an item onto another conveyor belt (e.g., the x-belt sorter). However, the finger belt and the x-belt sorter are only some examples of conveyors that can be used. The method 600 can be used to transfer an item from a first conveyor to any type of second conveyor at a selected location on the second conveyor.

At block 620, the PLC instructs the VFD controlling the queue belt to transfer the item onto the finger belt at the determined time (e.g., the induct time). Because the finger belt may already be moving, once the finger belt receives the item from the queue belt, at block 625 the finger belt transfers the item from the finger belt to one of the x-belts. In one embodiment, the x-belt sorter and the finger belt may move at constant speeds. As such, by controlling when the queue belt places the item on the finger belt (which takes into consideration the location of the item along the width direction of the belt), the PLC can ensure the item is disposed at a desired location of a second conveyor belt (e.g., a selected one of the x-belts).

Although method 600 can be performed without changing the speeds of the finger belt and the x-belt sorter, in other embodiments, the PLC may also change the speeds of one or more of these conveyor belts in order to accurately transfer the item. For example, the intersect logic may calculate an induct time where the item should be moved onto the finger belt in one second. However, the induct time can be reduced if the speed of the finger belt is reduced (or the speed of the x-belt sorter is increased). For example, the induct time may be reduced to 0.75 seconds if the finger belt is slowed down by 15%. As such, the PLC can adjust both the induct time and the speeds of the belts in order to place the item onto a desired location on the conveyor belt intersected by the finger belt.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A system comprising:
 a cross-belt (x-belt) sorter comprising a plurality of individual x-belts separated by buffers;

a feeder belt terminating at an acute angle with a side of the x-belt sorter and configured to transfer items onto the x-belt sorter;
a distance sensor configured to generate a distance measurement corresponding to a location of an item along a width of the feeder belt;
a queue belt terminating at a first end of the feeder belt that is opposite a second end of the feeder belt terminating at the x-belt sorter;
a presence sensor configured to detect the presence of the item on the queue belt at a location where the queue belt terminates at the first end of the feeder belt; and
a control system configured to:
receive the distance measurement;
adjust, based on the distance measurement, at least one of (i) a speed of the feeder belt and (ii) an induct time when the item is moved onto the feeder belt;
instruct the queue belt to transfer the item onto the feeder belt based on the induct time; and
stop the queue belt based on detecting the presence of the item on the queue belt.

2. The system of claim 1, wherein the distance sensor is mounted onto the queue belt and is configured to measure the location of the item along a width of the queue belt which corresponds to the location of the item along the width of the feeder belt.

3. The system of claim 1, wherein the control system comprises:
a motor controller coupled to a motor of the feeder belt, wherein the distance sensor is coupled directly to the motor controller and the motor controller is configured to adjust the speed of the motor based on the distance measurement.

4. A system, comprising:
a first conveyor;
a second conveyor terminating at a side of the first conveyor and configured to transfer items onto the first conveyor;
a distance sensor configured to generate a distance measurement corresponding to a location of an item along a width of the second conveyor; and
a control system configured to:
adjust, based on the distance measurement, a time at which the second conveyor transfers the item onto the first conveyor, wherein adjusting the time at which the second conveyor transfers the item onto the first conveyor comprises:
determining, based on the distance measurement, an induct time to activate the second conveyor to begin moving the item towards the first conveyor.

5. The system of claim 4, wherein an intersection between the side of the first conveyor and the second conveyor forms an acute angle, wherein the second conveyor comprises a plurality of parallel belts with different lengths controlled by a common motor.

6. The system of claim 4, wherein adjusting the time at which the second conveyor transfers the item onto the first conveyor comprises:
adjusting, based on the distance measurement, the speed used by the second conveyor when transporting the item to the first conveyor.

7. The system of claim 6, wherein the control system comprises:
a motor controller coupled to a motor of the second conveyor, wherein the distance sensor is coupled directly to the motor controller and the motor controller is configured to adjust the speed of the motor to adjust a speed used by the second conveyor when transporting the item.

8. The system of claim 4, further comprising:
a queue belt terminating at a first end of the second conveyor opposite a second end of the second conveyor terminating at the side of the first conveyor,
wherein adjusting the time at which the second conveyor transfers the item onto the first conveyor comprises:
determining, based on the distance measurement, an induct time to transfer the item from the queue belt onto the second conveyor.

9. The system of claim 8, wherein the first conveyor and the second conveyor move at constant speeds when the item is transferred from the queue belt to the second conveyor and when the item is transferred from the second conveyor to the first conveyor.

10. The system of claim 4, wherein the distance measurement represents an offset of the item relative to a center axis of second conveyor.

11. The system of claim 4, wherein the first conveyor comprises a plurality of individual x-belts, wherein the x-belts are configured to move in a direction perpendicular to a direction at which the first conveyor moves.

12. A method, comprising:
generating a distance measurement corresponding to a location of an item along a width of a first conveyor, wherein the first conveyor terminates at a side of a second conveyor;
adjusting a speed used by the first conveyor when transporting the item to the second conveyor based on the distance measurement, wherein adjusting the speed used by the first conveyor comprises:
transmitting the distance measurement from a distance sensor directly to a motor controller controlling a motor of the first conveyor, and
adjusting a default speed of the first conveyor using the distance measurement; and
transferring the item from the first conveyor to the second conveyor.

13. The method of claim 12, wherein an intersection between the side of the first conveyor and the second conveyor forms an acute angle, wherein the first conveyor comprises a plurality of parallel belts with different lengths controlled by a common motor.

14. The method of claim 12, further comprising:
determining, based on the distance measurement, an induct time to transfer the item from a queue belt onto the first conveyor.

15. The method of claim 12, further comprising:
determining, based on the distance measurement, an induct time to activate the first conveyor to begin moving the item towards the second conveyor.

* * * * *